United States Patent
Kochanski et al.

[11] 3,798,401
[45] Mar. 19, 1974

[54] LIQUID LEVEL RESPONSIVE SWITCH ASSEMBLY

[76] Inventors: Aloysius J. Kochanski, 27312 Spring Arbor Dr., Southfield, Mich. 48076; Charles J. Hire, 6 Cranswick La., Rochester, N.Y. 14618

[22] Filed: Aug. 30, 1972

[21] Appl. No.: 284,910

[52] U.S. Cl. .......................... 200/84 C, 340/244 A
[51] Int. Cl. ............................................ H01h 35/40
[58] Field of Search......... 200/84 R, 84 C; 335/274, 335/205, 206, 207; 340/244 A

[56] References Cited
UNITED STATES PATENTS

| | | | |
|---|---|---|---|
| 2,899,517 | 8/1959 | Hastings et al. | 200/84 C |
| 3,691,522 | 9/1972 | Hocking et al. | 200/84 C |
| 3,342,960 | 9/1967 | Dillon et al. | 200/84 C |
| 3,211,856 | 10/1965 | Bakke | 200/84 R |
| 2,133,077 | 10/1938 | Boddy | 200/84 R |
| 2,684,414 | 7/1954 | Kilpatrick | 200/84 R |
| 3,167,623 | 1/1965 | Kaleta | 200/84 C |
| 2,744,177 | 5/1956 | Barber | 200/84 R |

*Primary Examiner*—David Smith, Jr.
*Attorney, Agent, or Firm*—Lon H. Romanski

[57] ABSTRACT

An electrical switch assembly has a body or housing containing a moveable magnetic member and a float member carrying an armature; when the float member senses a reduction of the liquid level below a predetermined minimum level, the float causes the armature to move thereby permitting the moveable magnetic member to move and complete a related electrical circuit.

13 Claims, 8 Drawing Figures

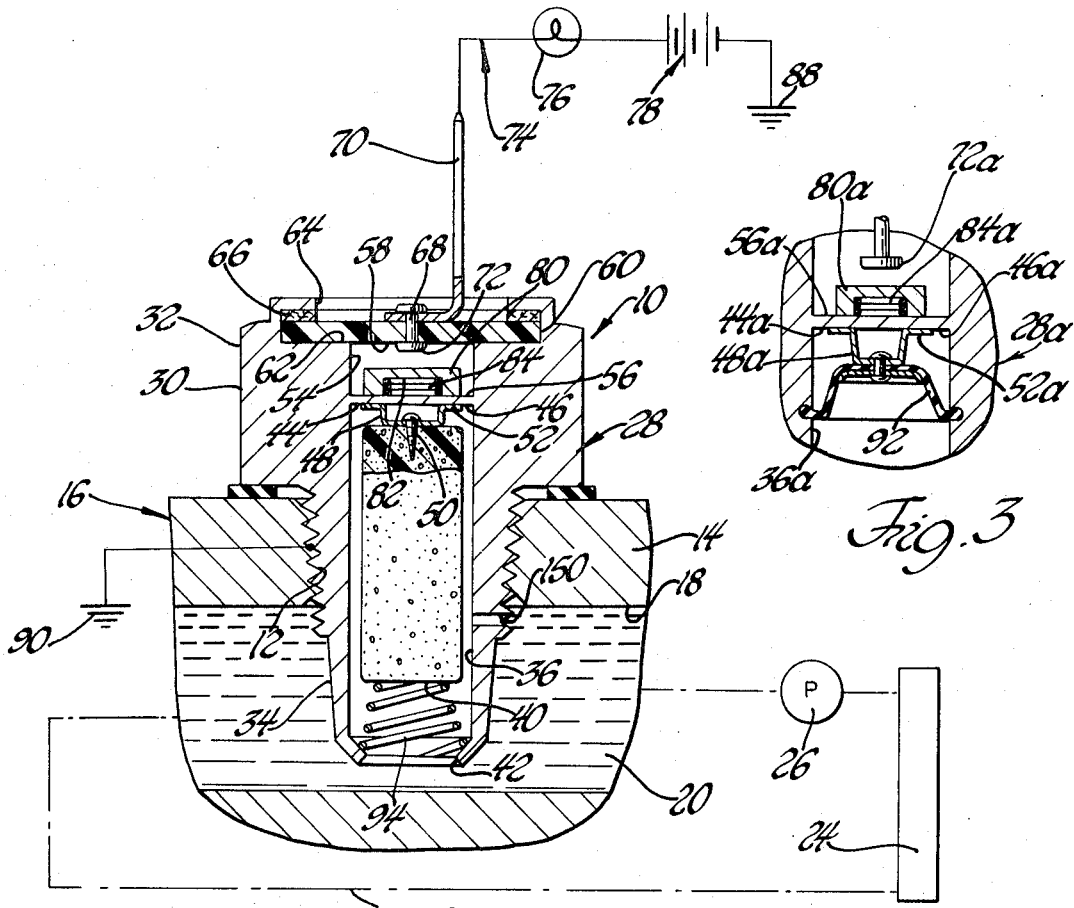
Fig. 1
Fig. 3
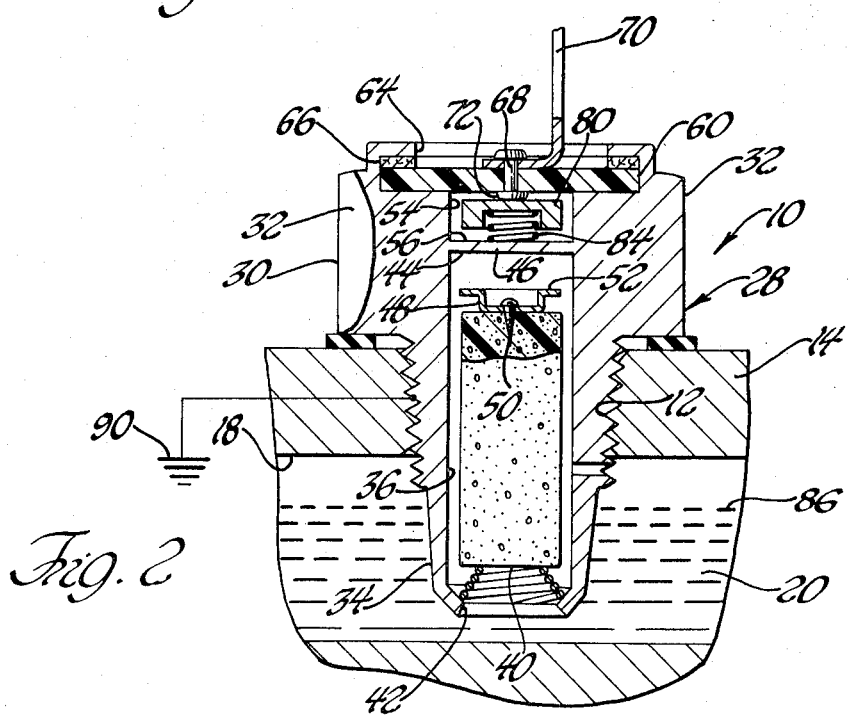
Fig. 2

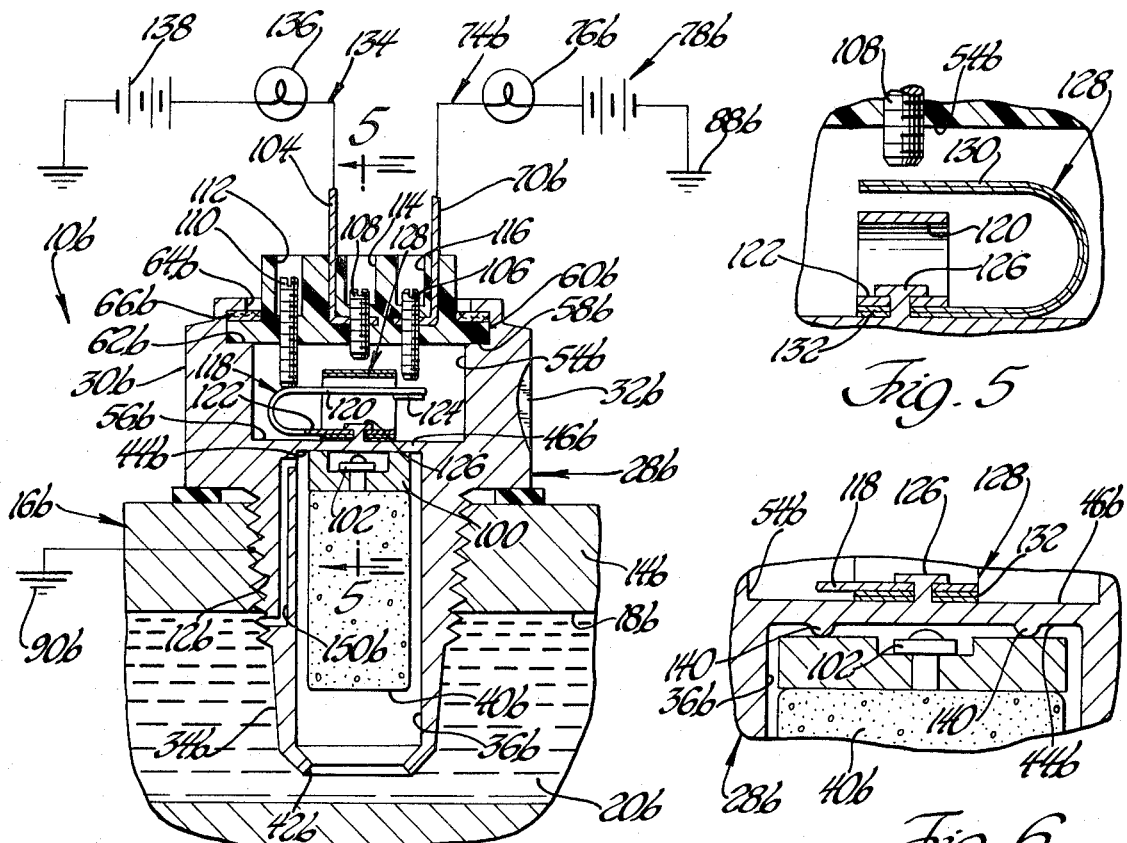
Fig. 4
Fig. 5
Fig. 6
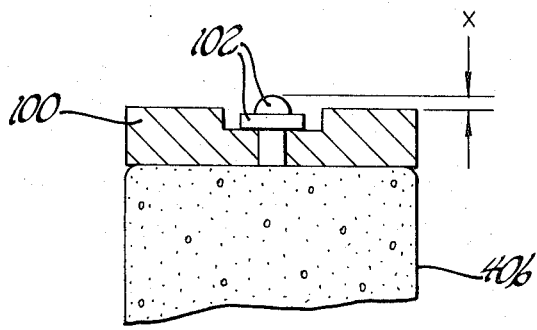
Fig. 7
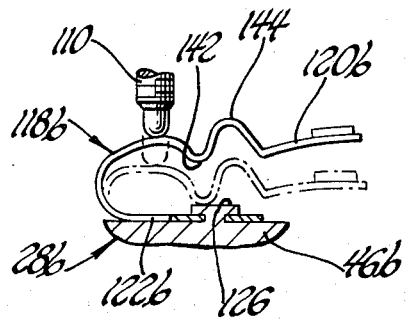
Fig. 8

LIQUID LEVEL RESPONSIVE SWITCH ASSEMBLY

BACKGROUND OF THE INVENTION

In many instances it is necessary to be able to determine that a loss of liquid has occurred from a related liquid-enclosing container, reservoir or conduit means.

For example, it is common practice to, in an internal combustion engine, employ a cooling system comprised of internally formed conduit or passage means within the engine for conveying therethrough a suitable liquid coolant which is, in turn, passed through a related heat exchanger or radiator for transferring excess heat to the ambient atmosphere. Further, such liquid cooling systems are often pressurized as by having associated pump means forcing the liquid coolant in a continuous path of circulation.

The prior art practice in respect to such engines has been to provide thermally responsive switching means usually threadably engaged with a suitable aperture formed at a selected portion of the engine block or housing. The purpose of such thermal switches was to be responsive to the engine attaining a particular predetermined temperature indicative of an over-heating of the engine. Upon such an over-heat being sensed, the thermal switch would close an electrical circuit and thereby energize a related device for warning the vehicle operator of the over-heat condition.

However, such prior art thermal switches have not proven to be either effective or sufficient especially as the trend to larger engines and the number of engine-driven vehicular accessories increases which, in effect, demand more engine power and attendantly generates greater heat.

More particularly, the effectiveness of such prior-art thermal switches is to a great extent dependent upon the rate of heat conduction through first the engine block or housing, then through the thermal switch housing, and then into the bimetal (or some similar member) which finally experiences thermally induced deflection and closes a related electrical circuit to the warning device. The time required to complete such heat conduction is almost always excessive to the degree that before the associated warning device is energized heat build-up in the engine is sufficient to cause permanent damage to the engine. This is particularly acute where the cause of over-heating is due to an unexpected loss in the circulating liquid coolant. That is, if there is a loss of coolant the path for the conduction of heat to the thermal switch increases because there is a consequent loss of surface contact area as between the remaining liquid coolant and the walls of the internally formed conduit means. It thusly becomes apparent that the problem of sensing an over-heat condition is even further aggravated when, as for example, there is a sudden total loss of liquid coolant due to a failure or rupture in any of the coolant conduitry.

Accordingly, the invention as herein disclosed and described, although not limited to the application above described (that is, associated with a coolant system), is primarily directed to the solution of the above as well as other attendant problems.

SUMMARY OF THE INVENTION

According to the invention, a liquid level responsive electrical switch assembly comprises housing means, first electrical contact means carried by said housing means, second electrical contact means carried by said housing means and effective to at times engage said first contact means to thereby complete an electrical circuit therethrough, and additional means responsive to said liquid level attaining a predetermined minimum level for preventing said second electrical contact means from engaging said first electrical contact means.

Various general and specific objects and advantages, including the use of switching means as herein disclosed in combination with any liquid level to be sensed such as the hydraulic brake fluid within the associated vehicular braking system master cylinder assembly, will become apparent when reference is made to the following written description considered in conjunction with the accompanying drawings.

DESCRIPTION OF THE DRAWINGS

In the drawings, wherein for purposes of clarity certain details or elements may be omitted from one or more views:

FIG. 1 is an axial cross-sectional view of a switch assembly, embodying the teachings of the invention, including a schematic associated wiring diagram;

FIG. 2 is a view similar to FIG. 1 but illustrating several of the elements thereof in a second operating position different from the positions shown in FIG. 1;

FIG. 3 is a fragmentary cross-sectional view of a second embodiment of the invention illustrating an operating condition like that represented in FIG. 1;

FIG. 4 is a view similar to FIG. 1 but illustrating a modified embodiment of the invention;

FIG. 5 is an enlarged fragmentary cross-sectional view taken generally on the plane of line 5—5 of FIG. 4 and looking in the direction of the arrows;

FIG. 6 is an enlarged fragmentary view of a portion of FIG. 4 illustrating certain modified elements;

FIG. 7 is a fragmentary view somewhat similar to FIG. 6 but illustrating a further modification; and FIG. 8 is an enlarged view of a fragmentary portion of FIG. 4 illustrating a modification of one of the elements chosen in FIG. 4.

DESCRIPTION OF THE PREFERRED EMBODIMENT

Referring now in greater detail to the drawings, FIG. 1 illustrates a switch assembly 10 threadably engaged with an internally threaded aperture 12 of a fragmentary portion 14 of an internal combustion engine 16. As also fragmentarily illustrated, the engine portion 14 contains conduit means 18 for the passage therethrough of a suitable liquid coolant 20, such as water.

As is often the case, internal combustion engines are provided with a pressurized cooling system generally schematically illustrated as by associated conduit means 22, radiator assembly 24 and a pump 26.

Switch assembly 10 is illustrated as being comprised of a main body or housing 28 having an enlarged upper portion 30, provided with suitable tool engaging surfaces 32, and a lower or downwardly depending externally threaded shank-like portion 34.

A first passage or chamber means 36 formed in body 28 is adapted to contain a suitable float member 40 and, further, communicates with the interior of engine coolant conduit means 18 as by aperture means 42 formed in the lower shank portion 34. The upper portion of chamber 36 is defined generally by the lower wall surface 44 of a generally transverse wall portion 46 which may be formed integrally with body 28.

The float means 40, which may be formed of any suitable material such as, for example, an expanded cellular polystyrene (often sold under the trademark "Styrofoam"), has an armature 48 carried at the top thereof and suitably secured thereto as by a fastener 50. Preferably, the armature means 48 is of an inverted hat-like configuration having an upper disposed generally laterally extending peripheral flange 52.

A second chamber means 54 is also formed generally within body 28 and is defined at its lower end by the upper disposed and wall surface 56 of transverse wall 46 while the upper end of chamber 54 is defined by the lower disposed surface 58 of cover-like or capping member 60 which is formed of an electrically non-conductive material and held in assembled relationship against an annular seating surface 62 as by a rolled-over flange 64 formed integrally with body 28. Of course, a suitable annular gasket 66 may be provided between retaining flange 64 and cover member 60.

An electrically conductive rivet-like contact 68 serves to physically secure an electrical terminal 70 to cover 60 as well as provide an electrical contact portion 72 disposed within chamber 54. Terminal 70 is, as illustrated, adapted for connection to related electrical circuitry 74 which may include a related warning device, such as a bulb 76, or other suitable or desirable auditory devices, and a source of electrical potential 78.

Upper chamber 54 also contains a permanent magnet member 80 which, preferably, is of a generally inverted cup-like configuration thereby defining a centrally disposed recess 82 into which, generally, a spring 84 may be received when compressed as shown in FIG. 1. In the embodiment illustrated, both the magnet 80 and spring 84 are electrically conductive; however, in contrast, the housing or body 28 is formed of brass or other non-magnetic material while still providing for an electrically conductive path.

OPERATION OF INVENTION

Whenever the level of the sensed liquid is at or exceeds a predetermined minimum liquid level, such liquid, because of the buoyancy of the float 40, will cause float 40 to move upwardly until the armature means 48 carried thereby abuts against surface 44 of transverse wall 46. The float 40 and armature 48 will remain in such position as long as the level of the liquid 20 remains at or exceeds such predetermined minimum liquid level. (It should, of course, be apparent that when a pressurized liquid system as that schematically illustrated in FIG. 1 is employed the liquid 20, after filling the conduit 18, would also completely fill the lower chamber 36 even if, for purposes of discussion, it were assumed that the predetermined minimum liquid level was attained at the instant that conduit 18 was completely filled.)

With the armature 48 being thusly moved up against surface 44 of wall 46, the magnetic flux density is increased and since the armature 48 cannot further move upwardly, the magnet member 80 moves downwardly against the relatively slight resilient resistance of spring means 84 until magnet member 80 abuts against the upper surface 56 of wall 46.

During this condition, there is no path for electrical current flow from or through the related circuitry 74 and the related responsive and energizeable means 76 is in a de-energized state.

Now assuming that for some reason the level of the liquid 20 has become lowered below the predetermined minimum liquid level and has, at a particular point in time, attained a level as indicated at 86 of FIG. 2.

Since the float means 40 is responsive to the level of the liquid 20, the float 40 moves downwardly as such liquid level is reduced so that when the liquid level becomes less than the said predetermined liquid level float means 40 has moved downwardly causing the armature means 48 to move away from the lower surface 44 of wall 46 as generally depicted in FIG. 2.

As a consequence of such downward movement of armature 48, the magnetic flux density is diminished thereby permitting the spring means 84 to move the magnet member 80 upwardly resulting in engagement by and between magnet member 80 and contact portion 72. As a result of this, an electrical circuit is completed from ground, as at 88, source of electrical potential 78, warning or output means 76, terminal 70, rivet contact 68, contact portion 72, magnet 80, spring means 84, wall 46, body 28, engine portion 14 and back to ground as at 90.

Such energization of output means 76, of course, can be employed as a sensory warning to the vehicle operator or, if desired, employed to in turn logically control or serially actuated other related control means.

In view of the above, it can be seen that the invention provides switching means totally responsive to the presence of a predetermined level of related liquid and that upon the diminution of such liquid level below such predetermined level, is effective for causing the actuation of a related electrical circuit.

Although only the preferred embodiment of the invention has been disclosed and described, the invention herein disclosed also contemplates further modifications and/or embodiments. For example, even though only one stationary contact 68 has been disclosed, it is apparent that if desired two or even more stationary contacts could be provided so that upon upward movement of the moveable contact member or magnet 80 would complete a circuit or circuits through all of such plurality of stationary contacts. In such instance, it would be apparent that the body 28 could be made of electrically non-conductive material since electrical grounding or completion of the circuit or circuits could be completed through one or even more of such plurality of stationary contacts.

Also, as fragmentarily illustrated in FIG. 3, liquid level responsive means other than a float member as 40 may be employed. In FIG. 3, elements which are like or similar to those of either FIG. 1 or 2 are identified with like reference numerals with a suffix *a*. Referring to FIG. 3, it can be seen that in the illustrated second embodiment or modification the float member 40 of FIG. 1 has been replaced by diaphragm means 92 which, in turn, carries the armature means 48a. The diaphragm means 92 would, of course, be displaced upwardly to the position shown by the liquid level attaining a predetermined level as previously discussed. Preferably, without the aid of any additional resilient or biasing means, the mass of the diaphragm means 92 and armature means 48a is sufficient to overcome any magnetic attraction from magnet member 80a whenever the related sensed liquid level drops to below the preselected minimum level.

Further, as shown in FIG. 1, additional vibration damping means as, for example, spring means 94 may be provided in order to damp any tendency of the float 40 to move away from the position shown in FIG. 1 due solely to any possible undue vibrations transmitted to the float means 40.

FIG. 4, a view similar to that of FIG. 1, illustrates another modified form of the invention. All elements in FIG. 4 which are like or similar to those of FIGS. 1 and 2 are identified with like reference numerals provided with a suffix b.

In the preferred form of the embodiment of FIG. 4, a generally cup-shaped magnet 100 is retained atop the float means 40b as by a pin-like retainer or a retainer portion 102 formed integrally with float means 40b and extending upwardly through cooperating aperture means formed in the magnet 100.

Cover member 60b is illustrated as carrying terminals 70b and 104 which, respectively, have threadably axially adjustable contact members 106 and 108 engaged therewith. Additionally, an adjustment member 110 may also be carried by cover 70b. If desired, the cavities 112, 114 and 116 above adjustment member 110, and contacts 108 and 106 may be suitably filled with a suitable sealant which, of course, could be also effective to lock such member 110 and contacts 108 and 106 in respective selected positions.

Upper chamber 54b contains a spring-like U-shaped armature means 118 which is made responsive to a magnetic field either by having the leg portions 120 and 122 thereof of magnetic material or by suitably securing, to the free end of arm 120, a suitable armature portion 124 which, in fact, may be of relatively soft iron. In the preferred form the leg portions 120 and 122 as well as the interconnecting bight portion would provide for an electrically conductive path. As shown, the lower leg 122 is secured and retained within chamber 54b as by an upstanding or peened-over portion 126.

Chamber 54b also contains a temperature responsive U-shaped bimetal 128 which, as shown in FIGS. 4 and 5, has its upper leg 130 free to move in response to temperature while the lower leg 132 is secured to the housing, in an electrically conductive relationship thereto, as by retainer means 102.

As generally schematically illustrated in FIG. 4, terminal 104 may be electrically in circuit with related circuit means 134 including sensory warning means 136 (or other suitable energizable means), and a related source of electrical potential 138 which may, in fact, be the same source 78b. The means 136 may be a warning lamp or bulb situated within the vehicular passenger compartment so as to be effective to warn the vehicle operator that a certain condition exists such as, for example, that the vehicle engine has attained a predetermined temperature indicative of an over-heating of the engine.

The operation of the embodiment of FIG. 4 is generally like that of FIG. 1. That is, when the liquid level responsive means 40b senses the attainment of a predetermined minimum level or elevation of liquid 20b, the magnet means 100 is moved upwardly as against wall 46b and thereby presents a magnetic flux field of sufficient strength, in the vicinity of leg 120 to cause the free end of leg 120 to move away from the end of contact 106 thereby opening circuit means 74b and maintaining means 76b in a de-energized state. Of course, when float means 40b moves downwardly, for reasons as previously discussed with reference to FIG. 2, the strength of the magnetic field in the vicinity of leg 120 is reduced thereby permitting the resilience of member 118 to move leg 120 upwardly and thereby engage contact 106 closing the associated circuitry 74b and energizing means 76b.

Adjustment member 110 is provided as a means for adjusting the sensitivity of leg 120 to the magnetic field as created by magnet 100. That is, since the force with which the leg 120 will close against contact 106 is dependent on both the resilient spring force developed generally in the bight portion of member 118 as well as in the leg 120, such force can be to a great extent altered or modified by applying an oppositely directed force against member 118, generally in the vicinity of the bight portion, by adjustment member 110 thereby, to that extent, lessening the degree of force the magnetic field has to exert against leg 120 to cause it to move away from contact 106. Accordingly, it can be seen that such adjustment means 110 becomes effective for varying the instant that circuit means 74b becomes opened relative to sensed level of the liquid 20b. That is, generally, the more force applied by adjustment member 110 the less float means 40b has to move downwardly before arm 120 moves against contact 106. Further, the degree of movement of arm 120 toward contact 106 can also be controlled as by the threadable axial adjustment of contact 106.

In addition to the above, when sufficient heat is transmitted to U-shaped bimetal 128, the free end of leg 130 will move sufficiently to engage adjustable contact 108 and thereby close the circuitry 134 and energize means 136. Contact 108 would, of course, be adjusted so as to cause completion of such circuitry 134 at a corresponding selected temperature.

In view of the above, it can be seen that, among other things, the switch assembly 10b is not only functional for creating an output indicative of loss of liquid level, but also effective for creating an output indicative of the attainment of a predetermined temperature even when the level of the sensed liquid has not diminished below a predetermined minimum level.

FIG. 6 is an enlarged fragmentary portion of FIG. 4 illustrating a further modification. That is, it is contemplated that means such as protuberances or dimples 140 be carried at or integrally formed on the surface 44b of wall 46b so as to engage the magnet 100 and hold it in somewhat spaced relationship to the wall 46b. This would prevent (or at least greatly minimize) the possibility of the float means 40b being held in the "up" position as by cohesive forces which are of appreciable magnitude with liquids of relatively high viscosity.

Another means of preventing the existence of such undesirable cohesive forces is illustrated in FIG. 7 wherein the post-like retainer means 102 is such as to project a distance, X, above the top surface of magnet 100 thereby assuring contact between the top of the post retainer means 102 and lower surface 44b of wall 46b and consequently preventing full face engagement between magnet 100 and wall surface 44b. In view of the teachings herein, other arrangements for overcoming or eliminating such viscosity induced cohesive forces will become apparent.

FIG. 8 illustrates one modified form of the armature means 118 shown in FIG. 4. In FIG. 8, the armature means 118b is illustrated as having its lower leg 122b effectively the same as leg 122 of FIG. 4; however, the upper leg 120b is somewhat different from upper leg 120 of FIG. 4 in that leg 122b has, what might be described as, integrally formed convoluted portions 142 and 144. Such convoluted portions enable leg 122b to exhibit a substantially constant spring rate, at the free end thereof, regardless of the adjustment caused by adjustment member 110, one extreme position being depicted in phantom line.

Although not essential to the practice of the invention it, nevertheless, is considered beneficial to provide air venting means so as to thereby enable the venting of any air which might become trapped within chambers 36 or 36b. One such venting means is illustrated as by conduit-like venting passage 150 in FIGS. 1 and 2 while another type of conduit-like venting passage is illustrated at 150b in FIG. 4. The primary concern leading to the provision of such venting means is to assure against air being somehow trapped in, for example, the upper half of chambers 36 or 36b and in consequence thereof preventing the otherwise free upward movement of the liquid displaceable means 40, 92 or 40b.

In addition, other modifications would, of course, be possible as, for example, the employment of a magnet as a switching member and a magnet positioned by the float means with such magnets being in magnetically opposed relationship.

Although only a preferred embodiment and select modifications of the invention has been disclosed and described, it is apparent that other embodiments and modifications of the invention are possible within the scope of the appended claims.

We claim:

1. A liquid level responsive electrical switch assembly, comprising housing means, first and second chamber means defined by said housing means and effectively separated from each other by wall means carried by said housing means, said first chamber being effective for communicating with liquid within an associated chamber so as to generally have the level of said liquid within said first chamber means indicative of the level of said liquid within said associated chamber, bouyant float means situated within said first chamber means as to be at least partially displaceable by said liquid within said first chamber means, magnet means secured to and carried by said float means at an upper one end thereof, said float means being effective as the level of said liquid within said first chamber means increases to move upwardly generally in accordance therewith so as to thereby progressively bring said magnet means into closer proximity to said second chamber means, first resiliently deflectable electrical contact means situated generally within said second chamber means, second fixed thermal electrical contact means carried by said housing means and having a contact portion disposed generally within said second chamber means and adapted to be operatively electrically engaged by said first deflectable electrical contact means, said first resiliently deflectable electrical contact means being normally effective when said float means and said magnet means is moved downwardly and away from said wall means a predetermined distance to engage with a resilient force of a first magnitude said contact portion of said second fixed contact means and thereby close an electrical circuit therethrough, said magnet means being effective when moved by said float means to a distance with respect to said wall means less than said predetermined distance to create a magnetic field within said second chamber means of a flux density sufficient to overcome said resilient force of said first magnitude and magnetically move said first resiliently deflectable electrical contact means away from said second fixed contact means to thereby open said electrical circuit, and manually adjustable adjustment means operatively engaging said first resiliently deflectable electrical contact means, said adjustment means being effective to mechanically apply a selectable calibrating force of a second magnitude less than said first magnitude to said first resiliently deflectable electrical contact means while permitting said first resiliently deflectable electrical contact means to remain in closed electrical circuit engagement with said second fixed electrical contact means in order to thereby reduce the effective resilient force holding said first resiliently deflectable electrical contact means in said closed electrical circuit engagement to a relatively lesser third magnitude, said lesser third magnitude enabling said magnet means to magnetically move said first resiliently deflectable electrical contact means to said open electrical circuit condition even when said magnet means is at a distance away from said wall means greater than said predetermined distance.

2. An electrical switch assembly according to claim 1 wherein said first resiliently deflectable electrical contact means comprises a generally cantilevered electrically conductive arm having a generally swingable free end adapted for moving into said closed circuit relationship with said contact portion of said second fixed electrical contact means, and wherein said adjustment means comprises an axially adjustable member carried by said housing means and operatively engaging said cantilevered electrically conductive arm at a point thereof near where said swingable free end swings about.

3. An electrical switch assembly according to claim 2 and further comprising separate armature means carried by said cantilevered electrically conductive arm near said swingable free end thereof.

4. An electrical switch assembly according to claim 1 wherein said first resiliently deflectable electrical contact means comprises a generally U-shaped electrically conductive member having first and second leg portions, said first leg portion being fixedly secured to said housing means generally within said second chamber means, said second leg portion being supported in a generally cantilevered fashion from a bight portion joining said first and second leg portions so as to have a generally swingable free end adapted for moving into said closed circuit relationship with said contact portion of said second fixed electrical electrical contact means, and wherein said adjustment means comprises an axially adjustable member carried by said housing means and operatively engaging said second leg portion in the vicinity of said bight portion.

5. An electrical switch assembly according to claim 4 and further comprising separate armature means carried by said second leg portion near the said swingable free end thereof so as to enhance responsiveness to said magnetic flux field.

6. An electrical switch assembly according to claim 1 wherein said first resiliently deflectable electrical contact means comprises a deflectable leaf-type spring having a first end generally fixedly secured to said housing and a second end generally free for swingable movement toward and away from said contact portion of said second fixed electrical contact means, said leaf-type spring including a portion thereof formed in an undulating wave-like configuration as to provide for a substantially constant spring rate as said second end moves away from said contact portion of said second electrical contact means.

7. An electrical switch assembly according to claim 6 wherein said adjustment means comprises an axially adjustable member carried by said housing means and operatively engaging said leaf-type spring at a point thereof as to result in said wave-like configuration being generally between said second end and said point of engagement of said adjustable member with said leaf-type spring.

8. An electrical switch assembly according to claim 4 wherein said axially adjustable member is threadably engageable with said housing means, and wherein axial adjustment of said axially adjustable member is achieved by threadable rotation of said axially adjustable member.

9. An electrical switch assembly according to claim 2 and further comprising protubering extension means, said extension means being effective to preclude said magnet means from moving into full engagement with said wall means so as to thereby prevent the full upper disposed surface of said magnet means coming into contact with said wall means.

10. An electrical switch assembly according to claim 9 wherein said protubering extension means is carried by said wall means, in a manner as to be depending generally downwardly therefrom and directed toward said magnet means.

11. An electrical switch assembly according to claim 9 wherein said protubering extension means is carried by said float means in a manner as to be extending generally upwardly therefrom and directed toward said wall means.

12. An electrical switch assembly according to claim 11 wherein said protubering extension means comprises an end portion of fastening means securing said magnet means to said float means, and wherein said end portion of said fastening means effectively extends a distance beyond the uppermost level of the upper disposed surface of said magnet means.

13. An electrical switch assembly according to claim 4 and further comprising a U-shaped electrically conductive thermostatic member also situated in said second chamber means, a third fixed terminal contact member adapted to be at times operatively engaged by one leg of thermostatic member upon said thermostatic member attaining a predetermined temperature sensed from said housing means, wherein the other leg of said thermostatic member has one side thereof in surface-to-surface engagement with said housing means, wherein said first leg portion of said first mentiond U-shaped electrically conductive member is placed in surface-to-surface engagement with an other side of said other leg of said thermostatic member, and wherein said first leg portion and said other leg are mechanically retained to said housing means by common fastener means.

* * * * *